United States Patent
Troyke

(10) Patent No.: US 8,262,067 B2
(45) Date of Patent: Sep. 11, 2012

(54) METHOD FOR CALIBRATING AN ELASTOMER SPRING OF A MOUNT, AND MOUNT PRODUCED ACCORDING TO THE METHOD

(75) Inventor: Karl-Heinz Troyke, Andernach (DE)

(73) Assignee: Trelleborg Automotive Germany GmbH, Hoehr-Grenzhausen (DE)

( * ) Notice: Subject to any disclaimer, the term of this patent is extended or adjusted under 35 U.S.C. 154(b) by 529 days.

(21) Appl. No.: 12/389,406

(22) Filed: Feb. 20, 2009

(65) Prior Publication Data

US 2009/0152780 A1   Jun. 18, 2009

Related U.S. Application Data

(63) Continuation of application No. PCT/EP2007/060486, filed on Oct. 2, 2007.

(30) Foreign Application Priority Data

Oct. 10, 2006  (DE) .......................... 10 2006 047 993

(51) Int. Cl.
*F16F 7/00*  (2006.01)

(52) U.S. Cl. .............. 267/140.12; 267/140.4; 29/896.93

(58) Field of Classification Search ............. 267/140.11, 267/140.12, 140.3, 140.4, 140.5, 141; 248/560, 248/575, 580, 634; 29/897.2, 896.93, 418, 29/527.1, 446

See application file for complete search history.

(56) References Cited

U.S. PATENT DOCUMENTS

| | | | |
|---|---|---|---|
| 5,024,425 A | | 6/1991 | Schwerdt |
| 5,613,668 A | * | 3/1997 | Brunerye ...................... 267/219 |
| 5,645,075 A | | 7/1997 | Palmer et al. |
| 6,094,818 A | * | 8/2000 | Ogawa et al. ............... 29/896.93 |
| 6,499,730 B1 | * | 12/2002 | Kuwayama et al. .......... 267/141 |
| 6,854,723 B2 | * | 2/2005 | Ogawa et al. .................. 267/293 |
| 7,063,310 B2 | * | 6/2006 | Power et al. ............. 267/140.12 |
| 7,204,479 B2 | * | 4/2007 | Power et al. ............. 267/140.12 |
| 2003/0107163 A1 | * | 6/2003 | Asano et al. ............. 267/140.12 |
| 2006/0061023 A1 | * | 3/2006 | Power ...................... 267/140.11 |

FOREIGN PATENT DOCUMENTS

| | | |
|---|---|---|
| EP | 0 499 996 A1 | 8/1992 |
| EP | 0 384 007 B1 | 3/1993 |
| WO | 2005/001305 A1 | 1/2005 |

OTHER PUBLICATIONS

International Search Report, dated Jan. 2, 2008.

* cited by examiner

*Primary Examiner* — Bradley King
*Assistant Examiner* — Thomas Irvin
(74) *Attorney, Agent, or Firm* — Laurence A. Greenberg; Werner H. Stemer; Ralph E. Locher

(57) ABSTRACT

A mount has a housing and a mount core. An elastomer spring supports the mount core on a housing and a receiving part is vulcanized into the elastomer spring. The receiving part has a receiving opening for the mount core. As the mount core is inserted, a preload is applied to the elastomer spring. The receiving part has at least one first core guide and a second core guide, between which the mount core is held. The receiving part also has a web which connects the core guides to one another in a first state and which is removed before or during the insertion of the mount core. The production of a mount of this type is simplified in this way.

5 Claims, 3 Drawing Sheets

METHOD FOR CALIBRATING AN ELASTOMER SPRING OF A MOUNT, AND MOUNT PRODUCED ACCORDING TO THE METHOD

CROSS-REFERENCE TO RELATED APPLICATION

This is a continuation, under 35 U.S.C. §120, of copending international application No. PCT/EP2007/060486, filed Oct. 2, 2007, which designated the United States; this application also claims the priority, under 35 U.S.C. §119, of German patent application No. DE 10 2006 047 993.9, filed Oct. 10, 2006; the prior applications are herewith incorporated by reference in their entirety.

BACKGROUND OF THE INVENTION

Field of the Invention

The present invention relates to a method for calibrating the elastomer spring of a mount, particularly of an automotive gearbox mount. The mount contains a housing and a mount core, the elastomer spring supports the mount core on the housing. A receiving part is vulcanized to the elastomer spring, the receiving part has an orifice for receiving the core of the mount. The elastomer spring is biased on insertion of the core. In addition the invention relates to a mount produced by this method.

Mounts of this kind are put to use in automotive engineering to support such assemblies as the gearbox or engine, for instance. Their task is to secure, for example, a gearbox to the bodywork of the vehicle. Another task required of such a mount is to isolate noise and vibration from the bodywork of the vehicle.

The elastomer spring of such a mount is produced by vulcanization, during which, shrinkage actions may occur resulting in the elastomer receiving internal tensile stress which can shorten the durability of the mount.

Since compressive stress has hardly any effect on the durability of elastomers, whereas tensile stress greatly shortens their durability, the elastomer spring is biased to counteract the tensile stress and to ensure that no tensile stress occurs in normal use of the mount.

Mounts of this type are known from prior art, European patent EP 0 384 007 B1, corresponding to U.S. Pat. No. 5,0424,425, which discloses a rubber sleeve spring wherein half shells are vulcanized into the elastomer spring which is biased by fitting an inner spring body and an inner connecting piece.

Disclosed in European patent EP 0 499 996 A1 is a vibration isolation apparatus for absorbing engine vibrations. The apparatus contains an outer cylindrical housing, an elastomer spring and two metal clips vulcanized in the elastomer spring. These metal clips have a T-shaped cross-section, each inner surface of the T facing the center point of the cylinder, whereas the end of the inner surfaces are swept towards the center point of the cylinder, resulting in guides for an inner cylinder. Inserting the inner cylinder opens up the clips in thus biasing the elastomer spring.

SUMMARY OF THE INVENTION

It is accordingly an object of the invention to provide a method for calibrating an elastomer spring of a mount, and a mount produced according to the method which overcomes the above-mentioned disadvantages of the prior art devices and methods of this general type, in which the bias of the elastomer spring and thus the dynamic response of the mount can be set by simple and cost-effective ways and measures.

With the foregoing and other objects in view there is provided, in accordance with the invention a method for calibrating an elastomer spring of a mount having a housing and a mount core. The method includes the step of disposing the housing and a receiving part in a vulcanization mold. The receiving part has first and second core guides spaced from each other and interconnected by a web. An elastomer spring is molded and vulcanized to support the receiving part in the housing. The mount core is inserted into the receiving part and thereby biases the elastomer spring, wherein the web of the receiving part is removed before insertion or on insertion of the mount core.

In accordance with the invention the receiving part has at least one first core guide and a second core guide, between which the mount core is held and the receiving part contains a web interconnecting the core guides in a first condition and which is removed before or on insertion of the mount core.

This has the advantage that it is now possible to define the shape and size of the receiving orifice for the mount core with high precision. In addition, spacing the core guides from each other by interposing a web is now simpler to achieve than in prior art because the core guides no longer need to be positioned individually in production of the elastomer spring.

Ideally, the first core guide and second core guide of the receiving part are arranged facing each other and the mount core is inserted between the core guides. The advantage of this is that no additional production measures are needed to further support the mount core when moved in the direction of the core guides.

Another advantageous aspect of the method is that the receiving orifice between the first core guide and the second core guide is first opened up, after which the web is removed.

The length of the web dictates the spacing of the first core guide from the second core guide.

It is particularly advantageous that the dimensions of the mount core to be inserted are set as a function of a desired bias of the elastomer spring. Tweaking the dimensions of the mount core is achieved by simple metalworking unlike tweaking the mold to change the shape of the elastomer spring which is complicated and costly.

A mount produced by this method is configured so that the core guides of the receiving part contains at least one guide rail assigned to a guide groove at the mount core or corresponds with a guide groove of the mount core in thus defining the mount core in a further direction of motion.

In a further embodiment of the invention, the guide rail contains a dovetailed cross-section.

It is furthermore advantageous that the web is arranged in the region of at least one guide rail.

To make it simple to shear the web it is provided that the web contains in the region of each core guide, a narrowed portion.

It is furthermore provided in another advantageous aspect of such a mount that the guide rails contain one-sidedly a ramped end to facilitate inserting the mount core.

It is particularly advantageous when the receiving part is made of a plastic material.

To further improve the damping response of the mount it is provided that the mount additionally contains a buffer.

Overloading the mount in certain directions can ruin the elastomer spring of the mount. This is why bulges of the elastomer spring are provided as stops which limit the excursion of the mount core horizontally.

Other features which are considered as characteristic for the invention are set forth in the appended claims.

Although the invention is illustrated and described herein as embodied in a method for calibrating an elastomer spring of a mount, and a mount produced according to the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
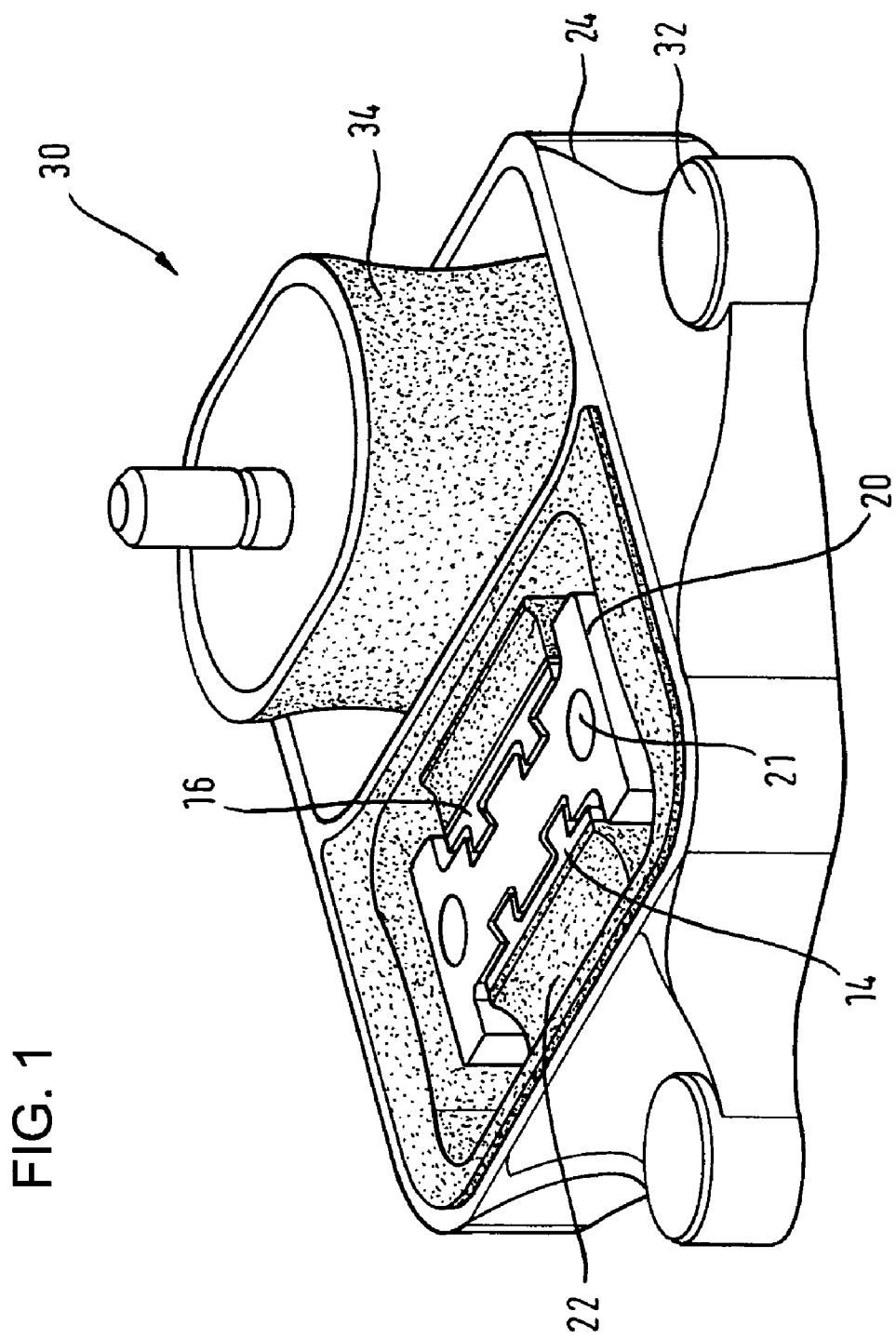
FIG. 1 is a diagrammatic, perspective view of an embodiment of a mount in accordance with the invention.
Figure 2:
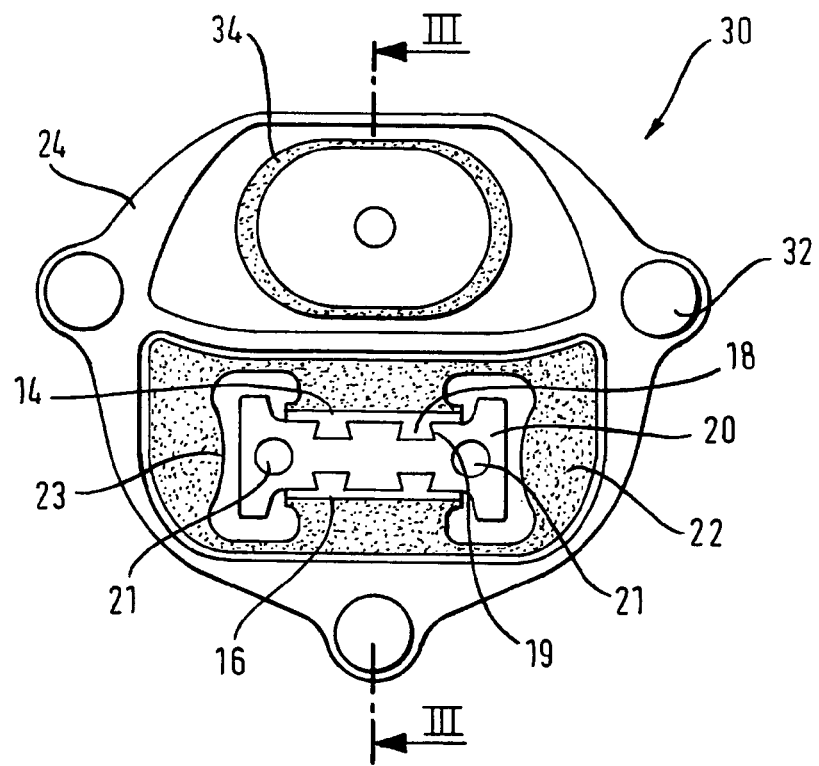
FIG. 2 is a diagrammatic top, plan view of the mount as shown in FIG. 1.

Referring now to the figures of the drawing in detail and first, particularly, to FIGS. 1 and 2 thereof, there is shown how a mount 30 having a housing 24 which is secured to a vehicle body by fasteners 32. Defined at the housing 24 is an elastomer spring 22 into which a receiving part 10 for a mount core 20 is vulcanized.

Figure 3:
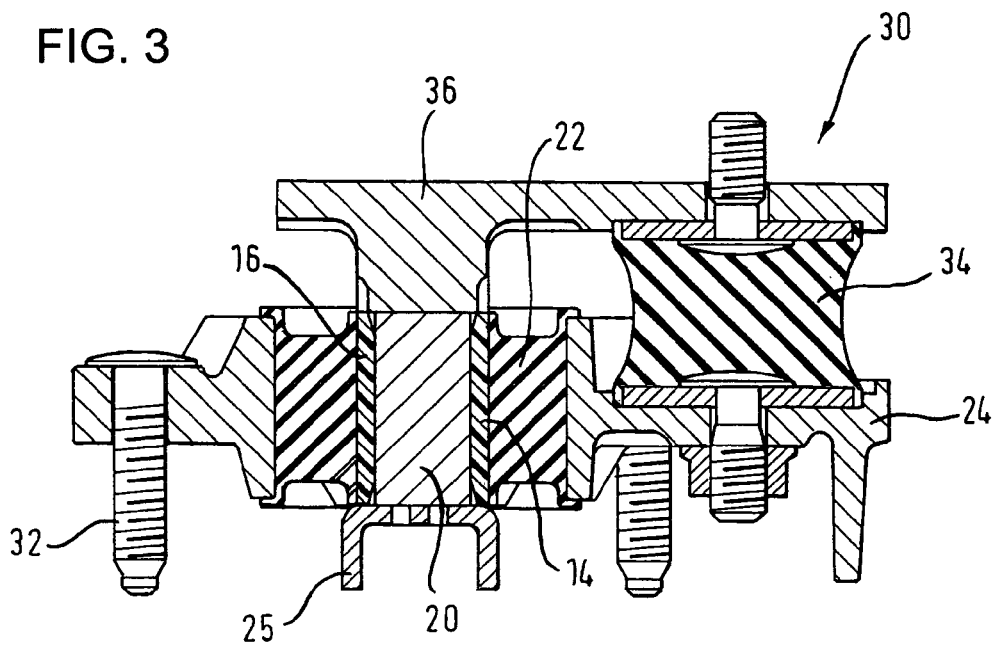
FIG. 3 is a cross-sectional view through the mount as shown in FIG. 2 taken along the line III-III, additionally showing a gearbox support.

Referring now to FIGS. 2 and 3 there is illustrated how the mount core 20 features bolting holes 21 for fitting a gearbox support 36. To further tweak the dynamic response of the mount a buffer 34 is provided connected in parallel to the elastomer spring 22 by use of the gearbox support 36.

Figure 4:
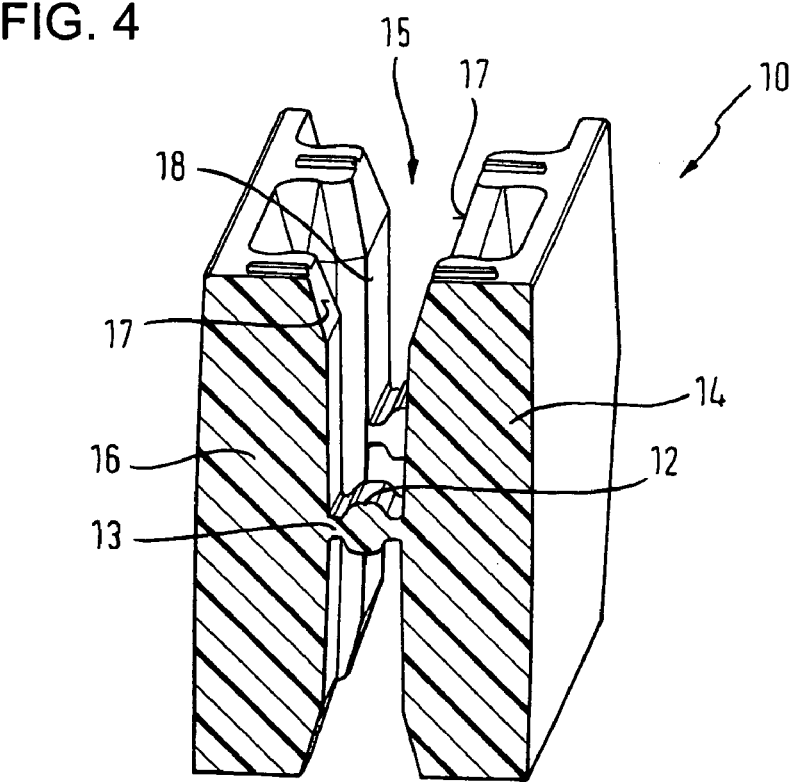
FIG. 4 is cross-sectional and perspective view of a preferred embodiment of a receiving part of the mount in accordance with the invention.
Figure 5:
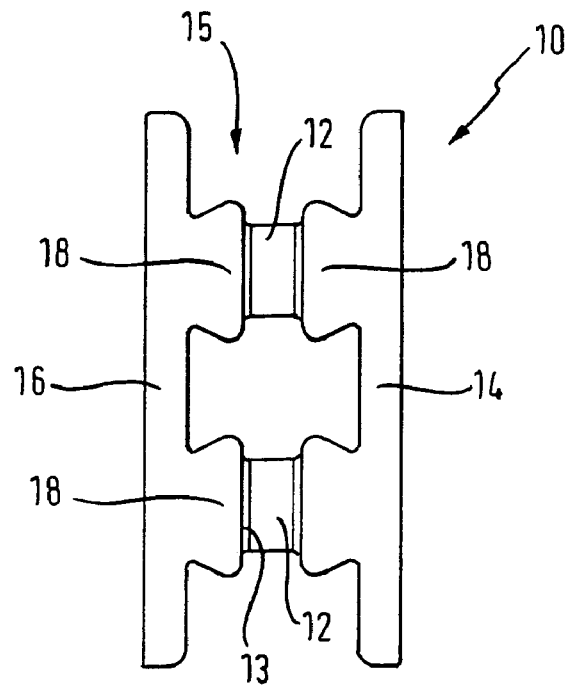
FIG. 5 is a top, plan view of the receiving part in FIG. 4.

Referring now to FIGS. 4 and 5 there is illustrated how the receiving part 10, made of a plastics material, contains a first core guide 14 and a second core guide 16 spaced from each other by webs 12.

Each of the core guides 14, 16 contains a guide rail 18 serving to fit the mount core 20 containing corresponding guide grooves 19.

The webs 12 connect the core guides 14, 16 in the region of the guide rails 18. The length of the webs 12 sets the spacing of the core guides 14, 16 from each other.

To simplify removing the webs 12 the transitions to the core guides feature waisted portions 13 functioning as configured frangible locations.

When the mount core 20 is inserted, first a receiving orifice 15 (see FIGS. 4 and 5) is opened up with a non-illustrated tool, resulting in the webs 12 snapping one-sidedly preferably at the waist or narrowed portion 13.

As an alternative the web 12 can be removed by a non-illustrated shear tool before the mount core 20 is inserted. It is, however, just as possible to shear the webs 12 by inserting the mount core 20.

Provided at the core guides 14, 16 are guide rails 18 engaging guide grooves 19 of the mount core 20 in thus defining the mount core 20. Provided furthermore are ramped ends 17 at the core guides 14, 16 to facilitate inserting the mount core 20 between the core guides 14, 16.

Inserting the mount core 20 between the core guides 14, 16 opens up the core guides 14, 16 of the receiving part 10 biasing the elastomer spring 22 to a degree as a function of the width of the mount core 20 to be inserted.

The wider the mount core 20 is selected, the higher the bias of the elastomer spring 22 and the narrower the mount core 20 the less the bias of the elastomer spring 22.

Provided furthermore in a preferred embodiment are bulges of the elastomer spring 22 as limiting stops 23 preventing over-excursion of the mount core 20 endwise and thus preventing the elastomer spring 22 from being ruined.

To produce the mount in accordance with the invention the housing 24 and the receiving part 10 are inserted in the vulcanization mold, after which the elastomer body is injection molded and fully vulcanized. After removal from the vulcanization mold, the receiving orifice 15 is opened up, snapping the webs 12 one-sidedly. The webs 12 are then removed by a shear tool, after which the mount core 20 is inserted between the core guides 14, 16.

The mount and its method of production as described presently excels by setting its dynamic response, particularly its vibration isolation capacity, being achieved by steps in production which are both simple and cost-effective. Now, instead of having to redesign the mold for the elastomer spring 22 every time, depending on the fitting situation involved, which because of the vulcanization mold likewise needing to be modified, is highly cost-intensive, simply the width of the mount core 20 needs to be adapted. This can be done by relatively simple ways and means by known methods of metalworking.

The invention claimed is:

1. A method for manufacturing an elastomer spring of a mount having a housing and a mount core, which comprises the steps of:
   providing a receiving part having at least one first and second core guide and an orifice formed there-between for receiving the mount core of the mount, the receiving part having a web interconnecting and formed integrally with the first and second core guide in a first condition;
   vulcanizing the receiving part to the elastomer spring and forming the elastomer spring to support the mount core on the housing;
   prestressing the elastomer spring by inserting the mount core in the receiving part;
   holding the mount core between the first and second core guides; and
   removing the web after vulcanization either before the inserting or on the inserting of the mount core.

2. The method according to claim 1, which further comprises disposing the first core guide and the second core guide of the receiving part to face each other and inserting the mount core between the first and second core guides.

3. The method according to claim 2, which further comprises first opening up the orifice between the first core guide and the second core guide and then removing the web.

4. The method according to claim 2, which further comprises setting a length of the web to dictate a spacing of the first core guide from the second core guide.

5. The method according to claim 1, which further comprises modifying dimensions of the mount core to be inserted in dependence on a desired prestressing of the elastomer spring before the mount core is inserted.

* * * * *